MAGNETIC CORE ASSEMBLY

Original Filed Oct. 26, 1956 2 Sheets-Sheet 1

INVENTORS
LAWRENCE T. LAPATKA
WILLIAM P. SCHMIDT
BY H. Walter [signature]
AGENT

MAGNETIC CORE ASSEMBLY

Original Filed Oct. 26, 1956

2 Sheets-Sheet 2

INVENTORS.
LAWRENCE T. LAPATKA
WILLIAM P. SCHMIDT
BY H. Walter [signature]
AGENT United States Patent Office 3,071,743

Patented Jan. 1, 1963

3,071,743

MAGNETIC CORE ASSEMBLY

Lawrence T. La Patka, Collingswood, N.J., and William P. Schmidt, Bethayers, Pa., assignors to Burroughs Corporation, Detroit, Mich., a corporation of Michigan Original application Oct. 26, 1956, Ser. No. 618,648, now Patent No. 2,965,864, dated Dec. 20, 1960. Divided and this application Dec. 21, 1959, Ser. No. 461

6 Claims. (Cl. 336—92)

The present invention relates to toroidal magnetic cores and more particularly to unit assemblies of such core structures and comprises a division of the co-pending application in the same names and with the same title as the present application, and bearing Serial No. 618,648, filed October 26, 1956, now Patent No. 2,965,864 and assigned to the assignee of the present invention.

In magnetic core assemblies as heretofore fabricated, cost and time factors have presented problems seriously handicapping their production on an economical basis and thereby necessitating undesirably high prices for equipment requiring such units. Time factor problems are primarily caused by the required hand manipulation of the exceptionally small parts used in their manufacture and the tedious interconnection of elements to assemble operative units. High cost naturally follows from the multiplication of man hours necessary for production, a factor heretofore found to be an obstacle to commercial marketing.

An object of the present invention is to provide a magnetic core assembly wherein the foregoing problems have been solved.

Another object is to provide a core assembly involving a minimum of parts which can be quickly and easily put together to form a compact core unit, effectively shielded from associated circuits, such as those used in electrical computer systems.

Another object is to provide a core assembly wherein a magnetic toroidal wound core is supported between lead wires of input and output circuits, and in a manner shielded against local interference.

In carrying out the object of the invention, an exemplary assembly would include a magnetic core having windings connected to lead wire terminals supported by insulating elements extending into and supporting the core. If desired, the assembly may be housed within an insulating cylinder telescoped within a metal shell having its ends sealed by a suitable material through which the lead wires project for circuit connection.

Various other objects, advantageous and meritorious features of the invention will become more fully apparent from the following specification, appended claims and accompanying drawings, wherein:

Figures 1, 2:
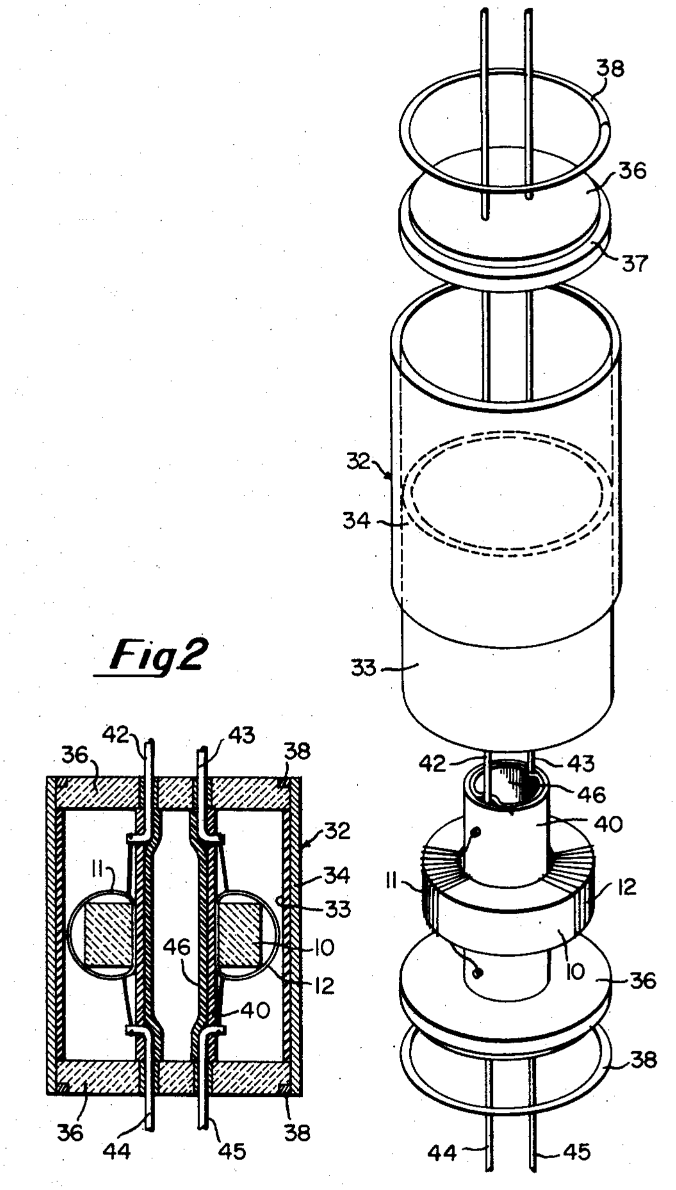
FIGURE 1 is an exploded perspective view of one form of the invention.
FIGURE 2 is a transverse sectional view of the unit of FIGURE 1, when assembled.

In the form of the invention shown in FIGURES 1 and 2 as claimed herein, the core sub-assembly is adapted to be telescopically encased within a housing. In this form a tube 40 of insulating, non-magnetic material, such as nylon, is positioned through the bore of the core 41, with its ends projecting at opposite sides of the toroid to support the inner ends of pairs of lead wires 42, 43 and 44, 45. As shown, each wire enters the tube end with its end bent radially outward through the tube wall thus to provide a terminal to which an end of one core winding is attached. For retaining each pair of wires in the ends of tube 40, a resilient tube 46 of insulating, non-magnetic material is inserted within a tube 40, with a snug fit so that each wire is insulated from the other by the internal tube. Tube 40 may, if desired, be formed of resilient material. With both tubes of resilient material and the outer tube of slightly less diameter than the bore diameter of the core but slightly larger than the dimension between wires passing through the core on opposite sides thereof, the windings on the core are pressed against the core and held by the expanding pressure of the tubes which thus function as positive retainers for both the core and the wires.

With reference to FIGURES 3 through 7 it will be seen that features of both previously described forms illustrative of the invention, may be combined in one unit identified by the numeral 49.

Figure 3:
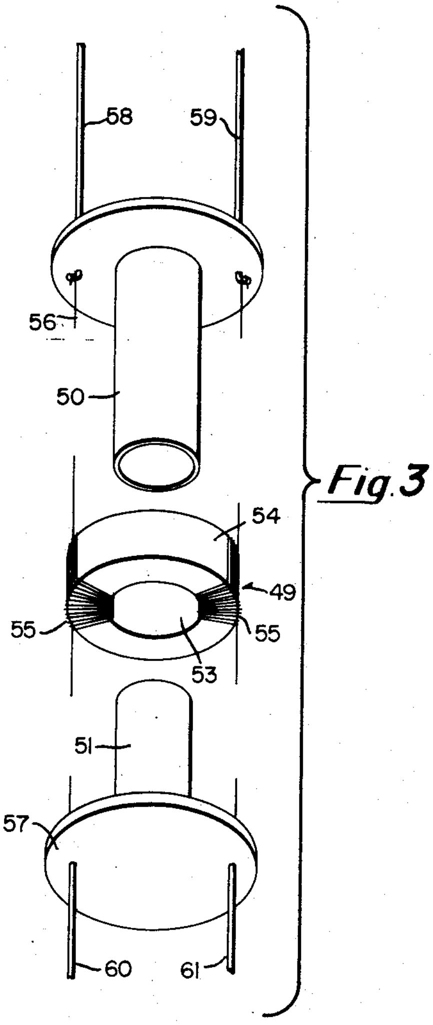
FIGURE 3 is an exploded perspective view of another modification of the invention.
Figure 5:
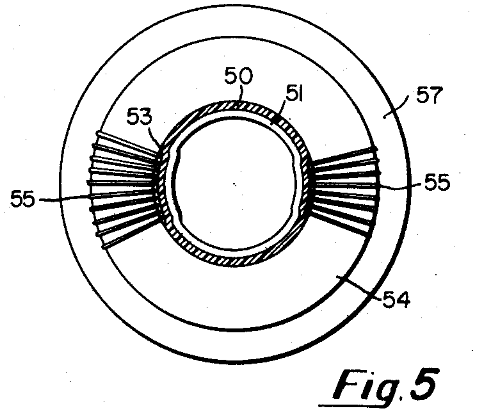
FIGURE 5 is a transverse sectional view of the modification shown in FIGURES 3 and 4.

With reference to FIGURE 3 it will be understood that outer and inner tubes 50 and 51 respectively are similar in construction both as to shape and material as are tubes 40 and 46 of FIGURES 1 and 2, except as described below. FIGURE 5 illustrates how the telescoped resilient tubes assume the shape of bore 53 of core 54 and the wires 55 passing therethrough, thus to press against both in a manner holding the wrapped core firmly on the tube assembly.

Returning to FIGURE 3 it is seen that tubes 50 and 51 are provided with transverse heads 56 and 57 of substantially rigid material either molded integrally therewith or formed separately and secured to the tube ends in some suitable manner. Passing through and secured to heads 56 and 57 are lead wires 58 through 61 which preferably are of the self supporting, easily bent type in common use on electrical components, such as resistors.

Figure 4:
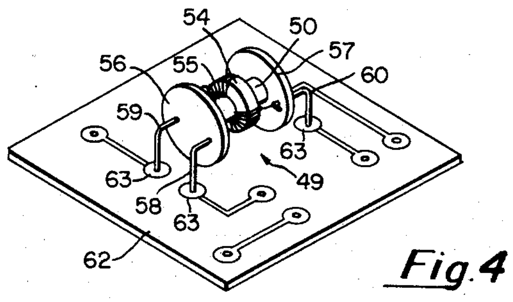
FIGURE 4 is a perspective view of the modification shown in FIGURE 5 showing it mounted on a printed circuit panel.

The above described assembly, as shown in FIGURE 4, lends itself well to automatic assembly processes whereby the component is positioned over a printed circuit panel 62 with its leads extending parallel with its axis whereby automatic machinery can bend the leads toward the panel and into apertures 63 provided therefor and in which they are secured as by bending over the ends of the leads on the other side of the panel. A feature of this modification is that heads 56 and 57 may be so positioned relative to each other that leads 58 through 61 are aligned thus to facilitate such panel assembly.

Figure 6:
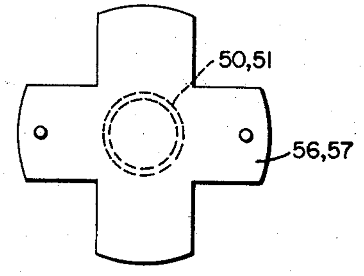
FIGURES 6 and 7 are plan views illustrating how certain elements of the invention may be modified.
Figure 7:
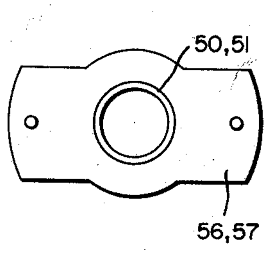

Heads 56 and 57 are disk shape as shown in FIGURES 3, 4 and 5, but it is understood that they may be formed in other suitable shapes, for example, such as those shown in FIGURES 6 and 7. Of course, where desirable, the whole assembly may be housed in a manner similar to those shown in FIGURES 1 and 2.

It will now be apparent that a magnetic core unit has been devised which is simple in construction and of few parts, all readily assembled as a compact assembly providing for attachment to associated apparatus.

We claim:

1. A magnetic core assembly comprising a magnetic core, windings on said core, a tube of resilient insulating material mounted within the bore of said core with its ends projecting therefrom, a sealed tubular and insulating housing for said core, a pair of lead wires extending into said housing and attached to one tube end and respectively bonded to the ends of one winding, and another pair of lead wires extending into said housing and attached to the other tube projecting end and respectively bonded to the ends of another winding thus to hold said tube in position within said housing and a second resilient tube of insulating material interfitting within said first tube to secure said leads to said first tube.

2. A magnetic core unit assembly comprising, a magnetic toroidal core, windings on said core, a retainer of insulating material extending through the bore of said core with its ends projecting from said core, and lead wires attached at one end to a projecting end of said retainer and bonded to the ends of said windings, said retainer comprising a pair of resilient telescoped tubular elements between which the ends of said leads are secured by the pressure of one tube against the other and wherein said core is retained on said tubes by the pressure of the tubes against said windings.

3. A magnetic core unit assembly comprising, a magnetic toroidal core, windings on said core, a retainer of insulating material extending through the bore of said core with its ends projecting from said core, and lead wires attached at one end to a projecting end of said retainer and bonded to the ends of said windings, said retainer comprising a pair of telescoped tubular elements each including a substantially rigid transverse head at the ends of the retainer when said tubular elements are in telescoped relation, and further, wherein said wire leads are secured to said heads and are bonded to the ends of said windings.

4. A magnetic core unit assembly comprising, a magnetic toroidal core, windings on said core, said windings passing through said bore of said core, a retainer of insulating material extending through the bore of said core with its ends projecting from said core, and lead wires attached at one end to a projecting end of said retainer and bonded to the ends of said windings, said retainer comprising a pair of resilient telescoped tubular elements, the outer diameter of said telescoped tubular elements being less than the diameter of said bore, but greater than the said diameter minus the thickness of the wires passing through the core, whereby said core is retained on said tubes by the pressure exerted thereby against the windings and said tubes.

5. A construction according to claim 3 and further including a tubular housing extending between said transverse heads thus to enclose said core.

6. A construction according to claim 5 wherein said housing comprises a pair of telescoped tubular members, the inner one being shorter than the outer one, the ends of the shorter one being recessed within the ends of the longer one and providing seats against which said transverse heads seat when the core and the retainer are assembled with the housing.

References Cited in the file of this patent

UNITED STATES PATENTS

| | | |
|---|---|---|
| 671,446 | Lorscheider | Apr. 9, 1901 |
| 2,823,362 | Geroulo | Feb. 11, 1958 |